Patented Dec. 9, 1930

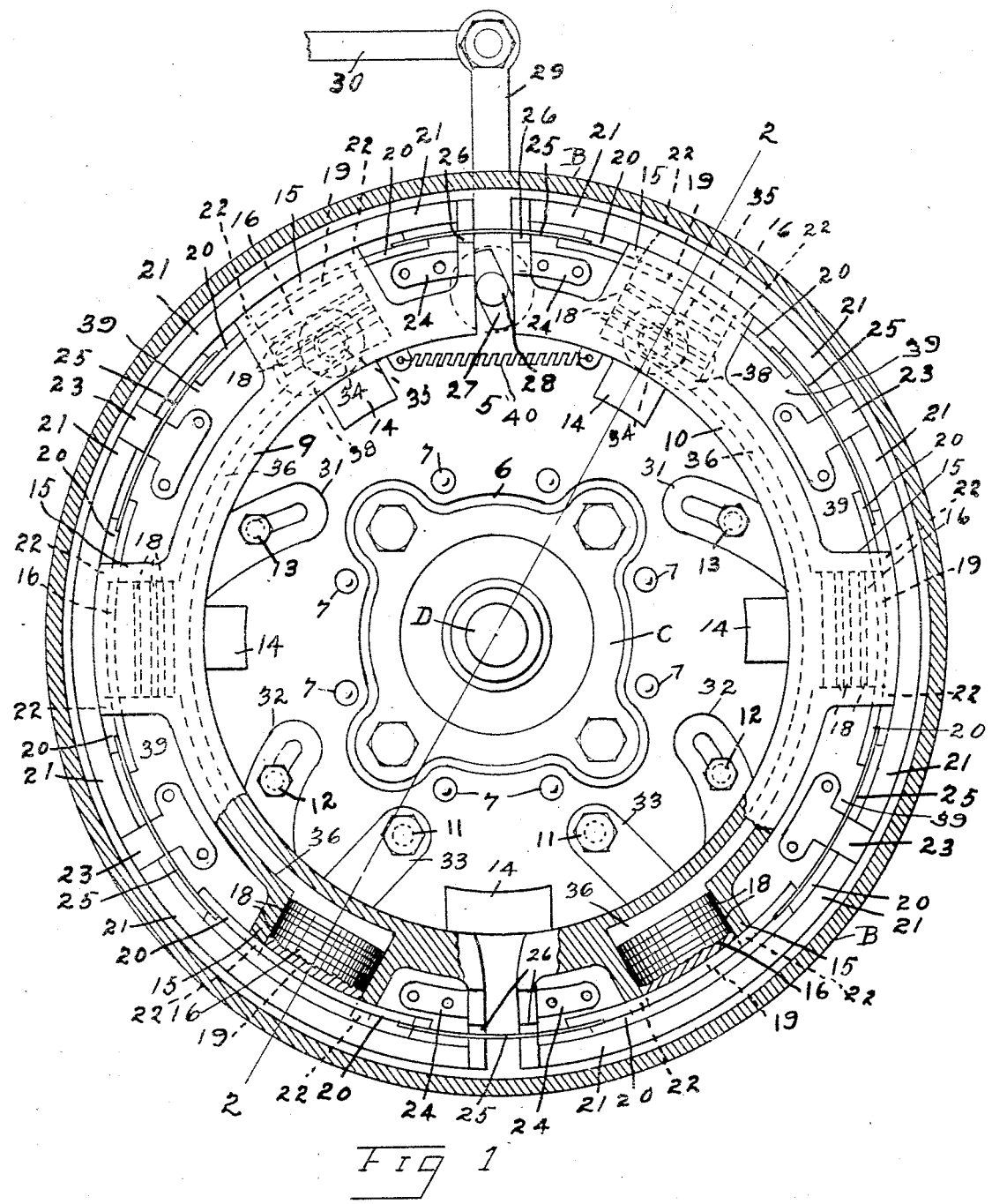

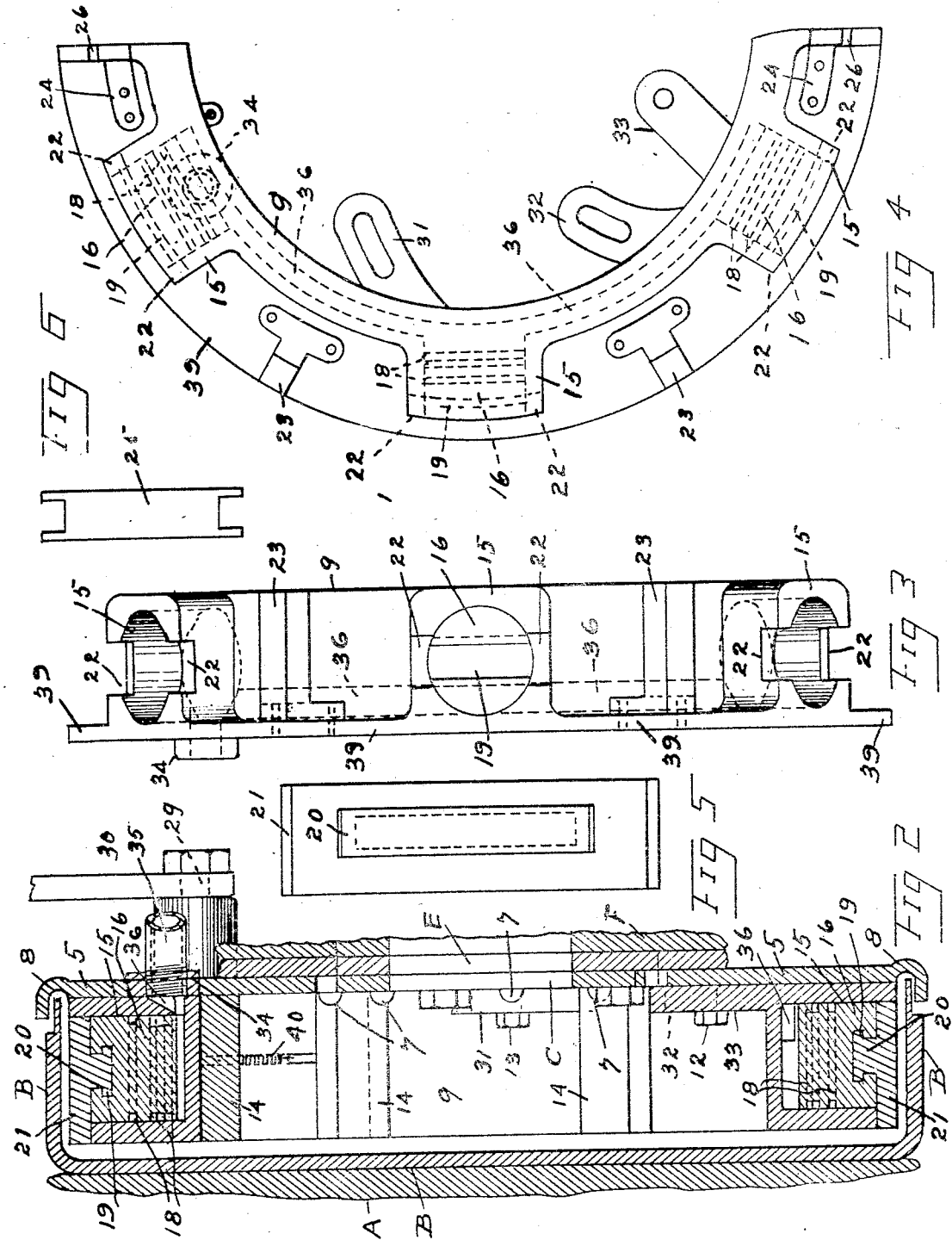

1,784,233

UNITED STATES PATENT OFFICE

FRANCIS LEROY HORSPOOL, OF SALT LAKE CITY, UTAH

VEHICLE AIR BRAKE

Application filed October 26, 1928. Serial No. 315,192.

This invention relates to a vehicle air brake and lever brake combined in one brake, and one of its objects is to provide a vehicle brake that can be operated by air and by a lever as well.

Another object of this invention is to provide an air brake with expanding jaws to be operated by a hand lever when the air is not used.

Another object of this invention is to provide an air brake with expanding jaws having cylinders thereon in which pistons are placed to move brake shoes against a brake drum and having means within said jaws through which air passes to said cylinders.

Another object of this invention is to provide an air brake that will equalize the braking power on all brake shoes at the same time.

Another object of this invention is to provide an air brake that when the air is applied to set the brakes the expanding jaws now in use are dispensed with.

With these and other objects in view the invention consists of certain novel features of construction as hereinafter described and claimed.

In the accompanying drawing forming a part of this specification and in which corresponding parts are denoted by like reference characters, is illustrated the preferred form of embodiment of the invention capable of carrying the same into practical operation, it being understood that the invention is not necessarily limited thereto, as various changes in its shape, proportions and general assemblage of its parts may be resorted to without departing from the principles of the invention or sacrificing any of its advantages, and the right is therefore reserved for making all the changes and modifications which will fairly fall within the scope of the invention.

This application contains some features of my application bearing date of October 13, 1928.

Referring to the drawing:

Figure 1 is a front view of the invention showing it after the wheel has been removed showing brake drum B in cross section.

Fig. 2 is a view on line 2—2 Fig. 1.

Fig. 3 is a face view of one of the expanding jaws with the abutments 24 removed.

Fig. 4 is a side view of Fig. 3.

Fig 5 is a bottom view of one of the brake shoes showing the rib 20 thereon.

Fig. 6 is a view of one of the springs 25.

The invention will be described as applied to a back wheel of a vehicle, while it also can be applied to the front wheels.

The reference character A denotes the back wheel of the vehicle to which a brake drum B is attached. C denotes the collar in which is placed ball bearings for supporting the shaft D. E denotes the anchor plate by which the invention is secured to the vehicle F.

The invention comprises in combination with the vehicle wheel, a brake drum B secured to the wheel. A brake plate 5 the periphery thereof having a flange 6 thereon under which the flange of the brake drum travels. The center of the brake plate 5 is cut out in such a manner to fit around the collar C. On the face of the brake plate are abutments or lugs 14 which may be integral therewith or spot welded thereon.

Pivotally placed on the brake plate 5 are expanding jaws 9 and 10 which rest upon the abutments 14. The jaws are pivoted to the brake plate by bolts 11 passing through lugs 33 and are movable on the face of the brake plate and are secured thereon by bolts 12 and 13 passing through slots in lugs 31 and 32. The brake plate is secured to the vehicle by rivets 7 which pass through the anchor plate E.

On the face of each jaw are a plurality of pockets forming cylinders 15 into which is placed pistons 16. Each piston has packing 18 thereon for making said pistons air tight within their cylinders.

The outer end of each piston has a T shaped slot 19 thereon into which is placed the T shaped rib 20 on the brake shoe 21.

Each of the cylinders has notches 22 therein in alinement with slot 19 to allow the brake shoe 21 to move freely over the outer end of the pistons and cylinders when the rib 20 is placed into the notches and slot.

On the back of each expanding jaw is a boss 34 having an aperture therein into which is threaded a pipe 35. The aperture enters an air port 36 which connects one cylinder to the other. Through the port 36 air passes from the pipe 35 to the cylinders for operating the pistons which move the brake shoes against the flange of the brake drum. Air applied to the cylinders in this manner will cause all the pistons to be moved outward at the same time thus giving an even braking power to all parts of the wheel.

The cylinders are connected by a rib 39 which forms the back wall of the cylinders. The rib has the same radius as the outer face of the brake shoes 21. To the rib are secured abutments 23 and 24. The abutments 23 and 24 have a right angular projection thereon, by which they are secured to flange 39. The abutment 23 is angular in cross-section and the abutment 24 is rectangular in cross section.

Under each abutment is placed a spring 25 the ends thereof rest on each end of the rib 20 of the brake shoes. The end abutments 24 have a notch 26 therein to allow the spring 25 to pass by each end thereof and connect the brake shoes in such a manner that the spring 25 will not interfere with the movement of the jaws 9 and 10.

The springs 25 when placed under the abutment 23 have two forks on each end thereof and when placed under abutment 24 one out side fork is removed so the springs may be put into place before the brake shoe is placed over the cylinder.

Placed between the upper end of the expanding jaws 9 and 10 is a jaw expander 27 the shaft 28 thereof passing through the brake plate 5 and having a lever 29 secured thereto. The lever 29 is secured to brake rod 30.

A slotted aperture 38 is placed through the brake plate 5 in alinement with the boss 34 on the jaws 9 and 10. The boss 34 moves freely within the aperture 38 when the jaws are moved by the emergency lever 29. After the jaws have been moved to set the brake and then released, spring 40 which is attached to each jaw draws them back to an unset position.

Having described the parts of the invention, I will now illustrate the operation of the same.

To set the brake air is applied through pipe 35 to port 36 to each cylinder with the effect as stated above. When air is released from the brake cylinders springs 25 move brake shoes and pistons to an unset position. During the operation of setting the brake by air the jaws rest upon the abutments 14 and bolts 11, 12 and 13.

When the invention is used as an emergency brake rod 30 is moved which in turn moves lever 29 and then moving the jaw expander 27 to expand the jaws thus moving them off the abutments 14 which allows them to swing on the bolts 11, 12 and 13 so they will come into contact with the flange of the brake drum and stop the vehicle. When the brake rod 30 is in released position the spring 40 will draw the jaws inward and back onto the abutments 14.

Having thus described the invention, what I claim as new and desire to secure by Letters Patent, is:

1. In a vehicle air brake comprising an emergency brake, a brake plate secured to the vehicle, expanding brake jaws to be operated on said brake plate, cylinders extending from each of said jaws, each of said cylinders having a piston therein, brake shoes placed on the outer end of said pistons, means for securing said brake shoes to said pistons, said jaws having an air port therein through which air passes to each of said cylinders to operate said pistons so they will place said brake shoes against a brake drum.

2. In a vehicle air brake comprising a brake drum secured to a vehicle wheel, a brake plate for said drum secured to a vehicle, expanding jaws mounted on said brake plate within said drum, said expanding jaws having cylinders projecting therefrom, each of said cylinders having a piston therein, a brake shoe on each of said pistons, each of said expanding jaws having an air port therein through which air passes to each of said cylinders for moving the pistons outward so they will move said brake shoes against said brake drum, means for returning said brake shoes and pistons to an unset position when said brake is released, means for expanding said jaws when air is not used for setting the brake and means for returning said jaws to an unset position.

3. In a vehicle air brake, comprising a brake drum secured to a vehicle wheel, a brake plate for said drum, said brake plate being secured to a vehicle, expanding jaws mounted on said brake plate within said brake drum, a plurality of pistons on each of said jaws, said pistons resting in cylinders on said expanding jaws, each of said jaws having an air port therein connecting each of said cylinders through which air passes into said cylinders for operating said pistons, means for supplying air to said air port, brake shoes operated by said pistons when air is applied to said cylinders, means for expanding said jaws for setting the brake when air is not used and means for maintaining said brake shoes and expanding jaws in an unset position.

4. In a vehicle air brake, comprising a brake drum secured to a vehicle wheel, a brake plate secured to a vehicle, expanding jaws attached to said brake plate, a plurality of cups on each of said expanding jaws, each of said cups forming pockets or cylinders for pistons, each of said cylinders being connected by an air passage within each of said jaws, means for supplying air to said air passage in each of said jaws for each of said cylinders to operate said pistons, a brake shoe operated by each of said pistons, means for securing said brake shoes to said pistons, means for expanding said jaws for setting the brake when air is not used, means for returning said jaws to an unset position and means for returning said brake shoes and pistons to an unset position when said brake is released.

5. In a vehicle air brake, comprising a brake drum secured to a vehicle wheel, a brake plate for said drum, said brake plate being secured to a vehicle, expanding jaws mounted on said brake plate within said brake drum, a plurality of brake shoes carried by said expanding jaws, air means carried by said expanding jaws for moving said brake shoes against said brake drum, means for expanding said jaws for setting the brake when air is not used and means for maintaining said brake shoes and expanding jaws in an unset position.

FRANCIS LEROY HORSPOOL.